(12) United States Patent
Dirnberger et al.

(10) Patent No.: US 7,664,690 B2
(45) Date of Patent: Feb. 16, 2010

(54) INSURANCE CLAIM MANAGEMENT

(75) Inventors: Erwin Dirnberger, Vienna (AT); Dirk C. Wehrmann, Mettmann (DE); Stefan Knipp, Cologne (DE)

(73) Assignee: Accenture Global Services GmbH (CH)

( * ) Notice: Subject to any disclaimer, the term of this patent is extended or adjusted under 35 U.S.C. 154(b) by 948 days.

(21) Appl. No.: 11/193,290

(22) Filed: Jul. 29, 2005

(65) Prior Publication Data

US 2007/0027725 A1 Feb. 1, 2007

(51) Int. Cl.
*G06Q 40/00* (2006.01)
(52) U.S. Cl. ............................................. 705/35; 705/4
(58) Field of Classification Search .................... 705/35, 705/4
See application file for complete search history.

(56) References Cited

U.S. PATENT DOCUMENTS

| | | | |
|---|---|---|---|
| 6,383,136 B1 | 5/2002 | Jordan | |
| 7,174,302 B2 | 2/2007 | Patricelli et al. | |
| 7,392,201 B1 * | 6/2008 | Binns et al. ..................... | 705/4 |
| 2003/0069760 A1 | 4/2003 | Gelber | |
| 2004/0093242 A1 | 5/2004 | Cadigan et al. | |
| 2006/0287947 A1 | 12/2006 | Toms | |
| 2007/0011088 A1 | 1/2007 | Cracchiolo et al. | |
| 2007/0260540 A1 | 11/2007 | Chau et al. | |

OTHER PUBLICATIONS

John Hancock Life Insurance Company Now Offering CPI-Linked Bonds Directly to Retail Marketplace PR Newswire. New York: Mar 23, 2004. p. 1.*
Rate of Increase For Health Costs May Be Slowing—Fewer Hospital Visits, Use Of Generic Drugs Contribute To Lower Inflation for Care By Barbara Martinez. Wall Street Journal. (Eastern edition). New York, N.Y.: Jun. 11, 2003. p. A.1.*
Business pays for insurance; [Final Edition] Phil Galewitz. Las Vegas Review—Journal. Las Vegas, Nev.: Dec 14, 1999. p. 1.d.*

* cited by examiner

*Primary Examiner*—Lalita M Hamilton
(74) *Attorney, Agent, or Firm*—Fish & Richardson P.C.

(57) ABSTRACT

A technique for evaluating insurance claim management may determine a target value for average loss costs per claim in a given planning period based on a regression analysis of average loss costs per claim in a predetermined base period. In addition, a performance indicator indicative of the performance of insurance claim management may be determined based on a difference between the determined target value and actually achieved average loss costs per claim in said planning period. Related apparatuses, systems, articles of manufacture are also described.

27 Claims, 9 Drawing Sheets

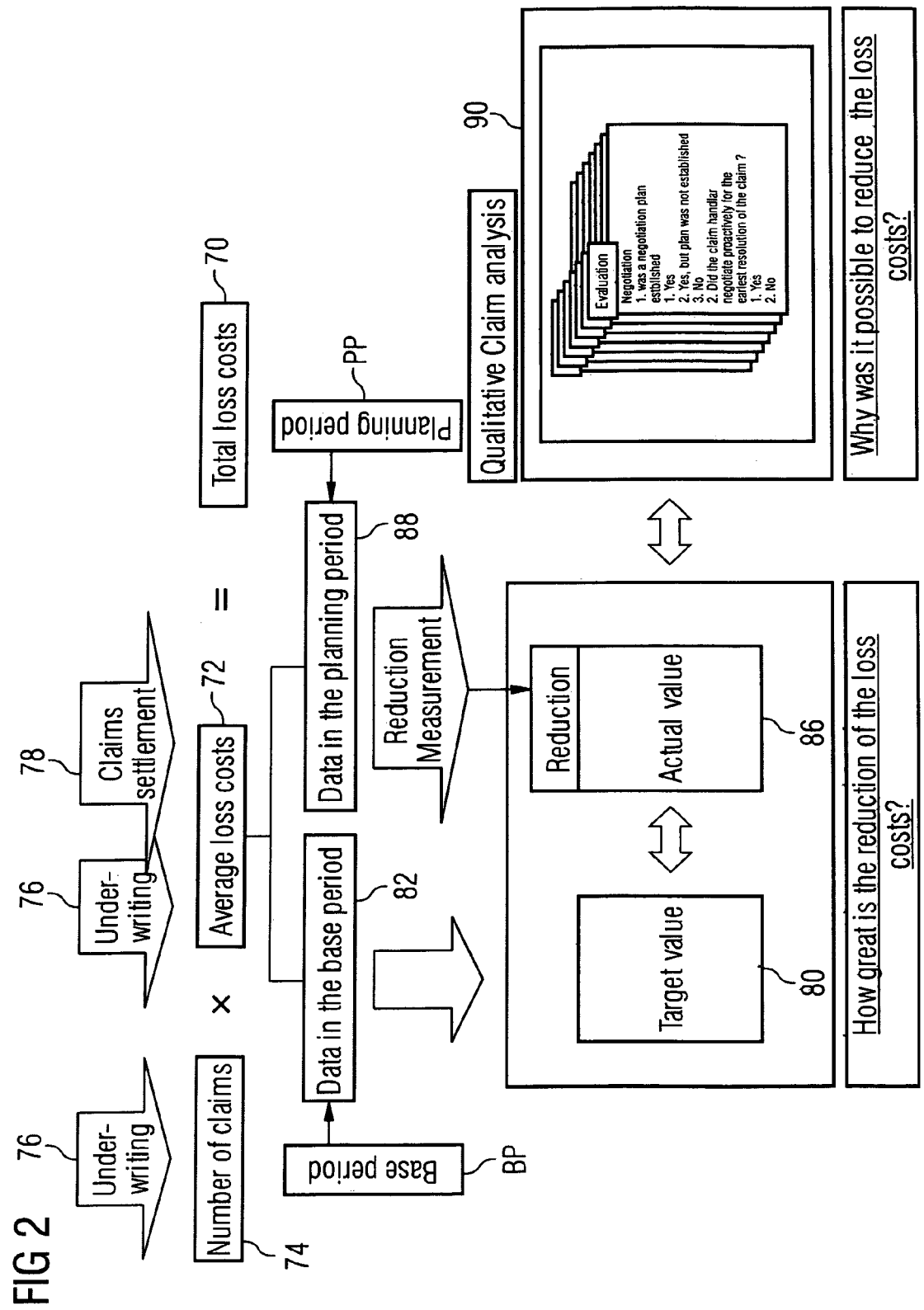

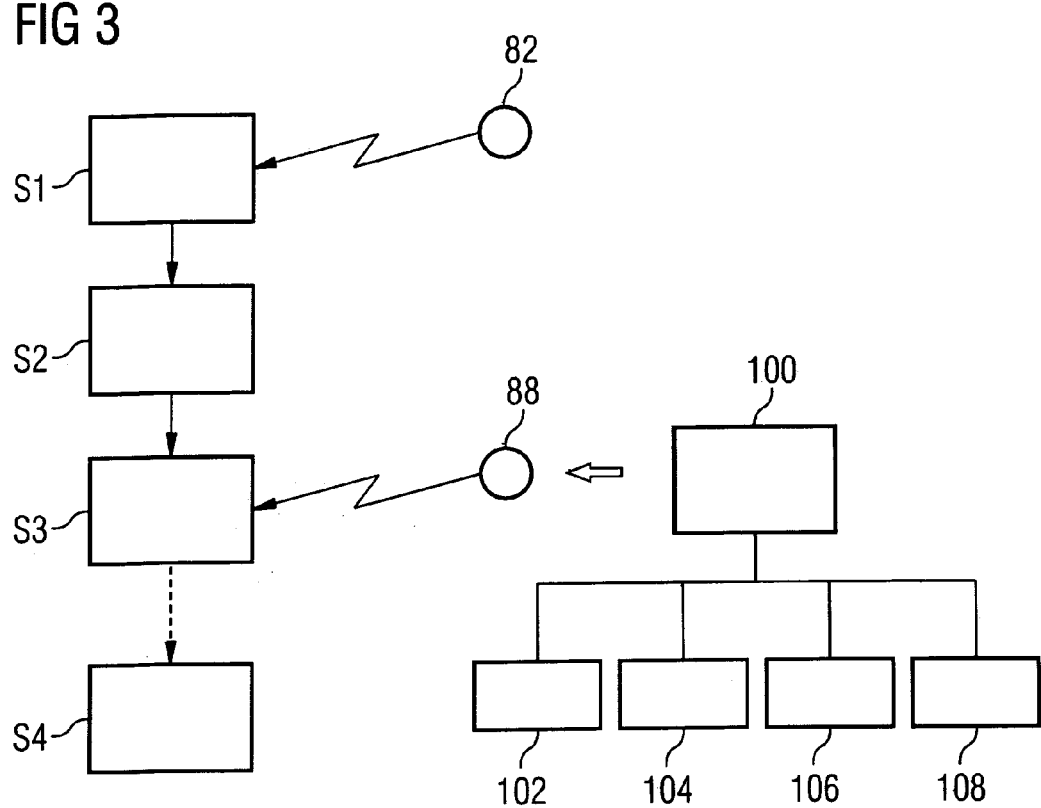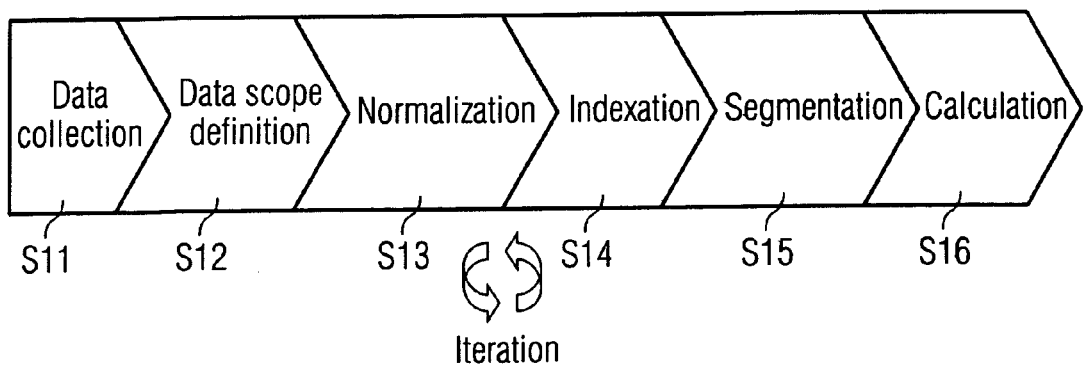

INSURANCE CLAIM MANAGEMENT

FIELD

The subject matter described herein relates to insurance claim management and evaluation.

BACKGROUND

In general, composite insurers may control actuarial profit before reinsurance via three performance metrics: premium volume, operating and sales costs and loss costs. Under the presumption of equal resource utilization, the reduction of the loss costs has the greatest influence on the insurance success. For some composite insurers, the loss costs, which can amount to more than 70%, comprise the largest block on the expenses side. However, most insurers find it difficult to estimate the impact of an optimized claim management on the loss costs and thus on the insurance success.

SUMMARY

The subject matter described herein relates to a computer-based insurance claim management evaluation method and a software tool.

One aspect includes a computer-based method for evaluation of insurance claim management. A target value for average loss costs per claim in a given planning period may be determined based on a regression analysis of average loss costs per claim in a predetermined base period. Thereupon a performance indicator may be calculated based on the difference between the target value and actually achieved average loss costs per claim for the planning period.

According to another aspect, an apparatus may comprise a target value determination tool and an evaluation tool. The target value determination tool may be operable to determine a target value for average loss costs per claim in a given planning period based on a regression analysis of average loss costs per claim in a predetermined base period. The evaluation tool may be operable to determine a performance indicator based on a difference between the target value and actually achieved average loss costs per claim in the planning period.

According to a further aspect, a system for evaluating an insurance claim management may comprise a computing device, at least one memory operably connected to the computing device and a memory access tool allowing a user to access the memory. The memory stores data of the average loss costs per claim over a predetermined base period. In some variations, the system may also comprise an insurance claim management evaluation tool having a target value determination tool operable to determine a target value for average loss costs per claim in a given planning period based on a regression analysis of average loss costs per claim in a predetermined base period and an evaluation tool operable to determine a performance indicator based on a difference between the target value and actually achieved average loss costs per claim for the planning period.

Articles of manufacture (e.g., computer program products, etc.), tangibly embodied on a machine-readable medium, are also described. Such articles of manufacture may include executable instructions that cause a machine to conduct one or more of the method acts described herein.

Similarly, systems are also described that may include a processor and a memory coupled to the processor. The memory may encode one or more programs that cause the processor to perform one or more of the method acts described herein.

The subject matter described herein provides many advantages. For example, it allows for the expansion of existing performance metrics systems to insurance companies opening up new possibilities described in detail below. In particular, claims administration may be controlled not only by the efficiency of handling, but also by the claim management effectiveness. In addition, the subject matter described herein allows for the realization of such forms of claim management outsourcing, in which a service provider and respectively its remuneration are determined not only on the basis of the increase in efficiency, but additionally also on the basis of its actual contribution to the reduction of claim payments.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIG. 2 illustrates a schematic of a method for evaluation of insurance claim management;

FIG. 3 illustrates a flowchart of a method for evaluation of insurance claim management;

FIG. 4 illustrates a flowchart of a baseline determination

Like reference symbols in the various drawings indicate like elements.

DETAILED DESCRIPTION

Figure 1:
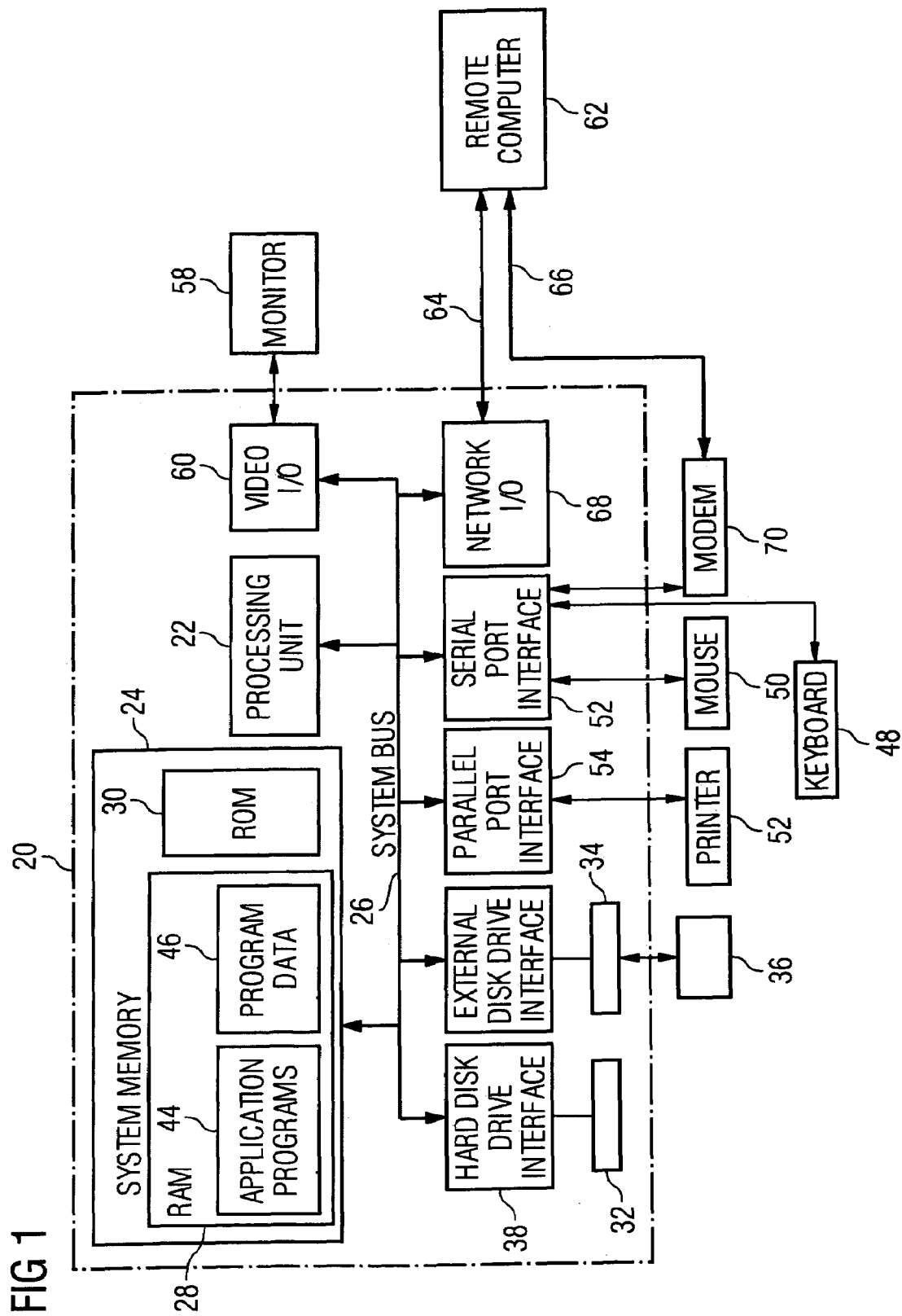
FIG. 1 illustrates a schematic of a computer system, which can be used in connection with a method for evaluation of insurance claim management.

With reference to FIG. 1, a system may include a general purpose computing device in the form of a conventional computing environment 20 (e.g. personal computer), including a processing unit 22, a system memory 24, and a system bus 26, that couples various system components including the system memory 24 to the processing unit 22. The processing unit 22 may perform arithmetic, logic and/or control operations by accessing system memory 24. The system memory 24 may store information and/or instructions for use in combination with processing unit 22. The system memory 24 may include volatile and non-volatile memory, such as random access memory (RAM) 28 and read only memory (ROM) 30. A basic input/output system (BIOS) containing the basic routines that helps to transfer information between elements within the personal computer 20, such as during start-up, may be stored in ROM 30. The system bus 26 may be any of several types of bus structures including a memory bus or memory controller, a peripheral bus, and a local bus using any of a variety of bus architectures.

The personal computer 20 may further include a hard disk drive 32 for reading from and writing to a hard disk (not shown), and an external disk drive 34 for reading from or writing to a removable disk 36. The removable disk may be a magnetic disk for a magnetic disk drive or an optical disk such as a CD ROM for an optical disk drive. The hard disk drive 34 and external disk drive 34 are connected to the system bus 26 by a hard disk drive interface 38 and an external disk drive interface 40, respectively. The drives and their associated computer-readable media provide non-volatile storage of computer readable instructions, data structures, program modules and other data for the personal computer 20. The data structures may include relevant data of the implementation of the subject matter described herein, as described in more details below. The relevant data may be organized in a database, for example a relational or object database.

Although the described environment described herein employs a hard disk (not shown) and an external disk 42, it should be appreciated by those skilled in the art that other types of computer readable media which can store data that may be accessible by a computer, such as magnetic cassettes, flash memory cards, digital video disks, random access memories, read only memories, and the like, may also be used in the operating environment.

A number of program modules may be stored on the hard disk, external disk 42, ROM 30 or RAM 28, including an operating system (not shown), one or more application programs 44, other program modules (not shown), and program data 46. The application programs may include at least a part of the functionality as detailed in FIGS. 2 to 11.

A user may enter commands and information, as discussed below, into the personal computer 20 through input devices such as keyboard 48 and mouse 50. Other input devices (not shown) may include a microphone (or other sensors), joystick, game pad, scanner, or the like. These and other input devices may be connected to the processing unit 22 through a serial port interface 52 that may be coupled to the system bus 26, or may be collected by other interfaces, such as a parallel port interface 54, game port or a universal serial bus (USB). Further, information may be printed using printer 56. The printer 56, and other parallel input/output devices may be connected to the processing unit 22 through parallel port interface 54. A monitor 58 or other type of display device may also be connected to the system bus 26 via an interface, such as a video input/output 60. In addition to the monitor, computing environment 20 may include other peripheral output devices (not shown), such as speakers or other audible output.

The computing environment 20 may communicate with other electronic devices such as a computer, telephone (wired or wireless), personal digital assistant, television, or the like. To communicate, the computer environment 20 may operate in a networked environment using connections to one or more electronic devices. FIG. 1 depicts the computer environment networked with remote computer 62. The remote computer 62 may be another computing environment such as a server, a router, a network PC, a peer device or other common network node, and may include many or all of the elements described above relative to the computing environment 20. The logical connections depicted in FIG. 1 include, for example, a local area network (LAN) 64 and a wide area network (WAN) 66 as may be found in offices, enterprise-wide computer networks, intranets and the Internet.

When used in a LAN networking environment, the computing environment 20 may be connected to the LAN 64 through a network I/O 68. When used in a WAN networking environment, the computing environment 20 may include a modem 70 or other means for establishing communications over the WAN 66. The modem 70, which may be internal or external to computing environment 20, may be connected to the system bus 26 via the serial port interface 52. In a networked environment, program modules depicted relative to the computing environment 20, or portions thereof, may be stored in a remote memory storage device resident on or accessible to remote computer 62. Furthermore other data relevant to the subject matter described herein may be resident on or accessible via the remote computer 62. The data may be stored for example in an object or a relation database. It will be appreciated that the network connections shown are illustrations and other techniques for establishing a communications link between the electronic devices may be used.

The above-described computing system is only one example of the type of computing system that may be used to implement the subject matter described herein. Those skilled in the art will readily recognize that other computing systems may alternatively be used.

In one variation, a computerized process may be used to evaluate insurance claim management, which may have an impact on the overall loss costs.

The loss costs may include compensation paid to claimant(s) or the insured. The compensation paid to the claimant(s) or the insured may be adjusted by deducing the recourse payments or other deductibles. The loss costs may optionally include one or more of loss adjustment, expenses paid to the claims adjusters, layers, external experts, etc.

In one example, average loss costs per claim may include an average of at least one of the total of the claim settlement costs, expenses, sharing agreements, reserves, recourse, reserves for recourse etc.

The challenges in determining the reasons for the observed changes in the overall loss costs lie in the fact, that apart from the operative claim management, there may be a plurality of further factors influencing the loss costs. Besides the "normal" stochasticity of the loss costs, there exist in first place external factors of influence, such as the frequency and intensity of natural events and major damage events, or the general and claim-specific price development. Furthermore, there exists a number of internal influence factors such as, for example, insurance product design, risk and underwriting policy, as well as marketing and sales activities.

The present subject matter for evaluation of the insurance claim management allows for a reliable and quantitative estimation of the aggregate success of measures to reduce the loss costs. To this extent, the present subject matter utilizes average loss costs per claim as a central measurement value in order to exclude the underwriting effects associated with the quantities effects related to the number of claims. Further internal and external factors of influence may be further excluded, except for the operative management.

The loss costs C can be defined as a product of the number of claims N and average loss costs per claim $\overline{C}$:

$$C = N * \overline{C} \qquad (1)$$

The above mentioned factors of influence may affect at least one of factors number of claims or average loss costs per claim, some affect even both.

Table 1 gives an overview of the major factors of influence, the way they affect the loss costs and methods to adjust for their influence, which will be described in more detail further below.

TABLE 1

| factor of influence | influences | | |
|---|---|---|---|
| | number of claims | average loss costs per claim | adjustment method |
| Natural and major damage events | yes | yes | normalization |
| Price development | — | yes | price indexing |
| Product change, change in coverage | yes | yes | condition indexing |
| Risk and underwriting policies | yes | yes | portfolio indexing |
| Marketing and sales activity | yes | yes | portfolio indexing |
| Operative claim management | — | yes | target metric |

As seen from Table 1, the operative claim management can influence only the average loss costs per claim, not, however, the number of claims reported. Improved fraud detection may increase for example the number of claims closed without payment, the cost savings aspect, however, may be considered in the average costs of damage.

FIG. 2 shows a schematic of a computer-based method for evaluation of insurance claim management useful for understanding and implementing the subject matter described herein. The central measurement value may be the average loss costs per claim 72. The factor loss costs 70 itself may be a product of the average loss costs per claim 72 and the number of claims 74.

Underwriting 76 may influence the number of claims 74. The average loss costs per claim 72 may be influenced by underwriting 76, claims settlement activities 78, etc.

A target value 80 may be determined in a predetermined base period BP based on a regression analysis of data 82 of the average loss costs per claim in the base period BP.

Operative Management measures may lead to a reduction of the actual average loss costs per claim in the planning period PP over the forecasted target value 80. A reduction measurement 84 may be undertaken, which comprises determining an actual value 86 of the average loss costs per claim in the planning period PP based on data 88 of the average loss costs per claim in the planning period PP. The actual value 86 may be compared to the target value 82 and a performance indicator may be determined.

The quantitative evaluation of insurance management may be supplemented by a qualitative analysis 90 of the data related to the claims, which may additionally provide valuable information as to the actual cause of the reduction (or increase) of the loss costs in the planning period and optionally analysis of the contribution of the individual management measures to the reduction (or increase) of overall loss costs.

FIG. 3 shows a flowchart of a method for evaluation of the insurance claim management useful for understanding and implementing the subject matter described herein.

The insurance claim management evaluation method may comprise a step of determining a target value. The determination of the target value may involve a step S1 of determining a baseline for a predetermined base period. The baseline may be determined based on a regression analysis of the available data 82 of the average loss costs per claim within the predetermined base period. To this extent a regression analysis, such as a linear regression, logistic regression, Poisson regression, supervised learning or other prediction method may be employed.

In a linear regression analysis a straight line (baseline) may be fitted to the available data 82 of the average loss costs per claim in the base period. The estimated time dependency of the average loss costs per claim (baseline) may be expressed as:

$$\overline{C}_{est}(T) = a + bT \quad (2)$$

wherein $\overline{C}_{est}(T)$ represents the average loss costs per claim estimated via linear regression analysis and T represents the time or period of time, e.g. a given quarter of the year. Different criteria for the fit to the available initial data may be used, for example least squares fit.

The calculated baseline provides an expected time dependency of the average loss costs per claim and allows a prediction for the future time behavior of the average loss costs per claim to be made.

The parameters of the so determined baseline are its slope b and intercept or constant factor a. Different statistical parameters may be used to determine the reliability of the baseline, such as for example the coefficient of determination, often called $R^2$. A coefficient $R^2$ close to 1 generally indicates greater reliability of the determined baseline.

The base period may extend over 5 to 10 years. In one variation, a more precise application may be achieved if data related to the insurance claims may be available for the last five to ten years in as uniform as possible data format.

Once the baseline is determined, a target value for the average loss costs per claim in a planning period may be calculated in a second step S2. The target value may be determined for example at the end of the planning period following the base period by an extrapolation such as a linear extrapolation of the determined baseline.

During the planning period different claim management measures may be employed, which may lead to a reduction of the actual loss costs. The management measures 100 may include for example one or more of specialization 102, replacement in kind 104, recourse 106, fraud prevention 108, etc. Further examples of management measures may include at least one of the following measures:

online-evaluation of claims;
    effective rental car management;
    quick first contact with claimant and insured;
    timely identification of appropriate appraiser;
    immediate claim notification;
    complete claim notification;
    immediate, correct verification of coverage;
    quick, accurate estimation of first reserve;
    immediate resolution;
    fast assignment to claim agent;
    identification of appropriate claim agent;
    fast claim transfer to subsequent claim agent;
    effective management of appraiser;
    provision of correct documents for evaluation;
    involvement of garages of trust;
    efficient document management;
    fraud detection and handling;
    systematical use of recovery approaches;
    professional complaint management;
    prevention of unnecessary appraisals;
    smart negotiation strategy and negotiation;
    timely handling of recovery;
    sufficient, qualified intensity of investigation;
    investigation and immediate claim settlement by claim field service;
    basic claim training;
    qualified investigation through claim field service;
    present value related repairs;
    goal-oriented selection of attorneys;
    standardized, appropriate strategy of investigation in case of total theft;

systematic maintenance of partner data including for example complete communication/contact information, organization;

technical support of claim agents;

glass repairs through partner companies;

standardized, appropriate strategy of investigation in case of bodily injury; etc.

A third step S3 may determine a performance indicator based on a comparison of the actual value of the average loss costs per claim in the planning period (e.g. at the end of the planning period) determined based on data 88 of the average loss costs per claim within the planning period. The performance indicator may be expressed as the difference between the target value and the actually realized value, multiplied by the actual number of claims. This results in a quantifiable metric value (performance indicator), which may be indicative of the actual contribution of the result of the claim management to the corporate profit.

The determined performance indicator allows evaluation of the result of claim management with a quantifiable statistical accuracy. However, it only conditionally offers conclusions as to the actual causes for the obtained result of the claim management, so that there may be additionally needed qualitative methods for evaluating the success of claim management, e.g. in form of an ex-post analysis of the already closed files. Optionally, at step S4, a qualitative analysis of the claim data may be provided. Such claim data analysis may provide substantial insight to improvement potentials in claim management.

As already indicated above, the central measurement value average loss costs per claim may be adjusted for various external and internal influence factors (with the exception of the operative claim management), which may undermine the statistical significance of the obtained performance indicator. This may be achieved by employing normalization, indexing and/or segmentation. After performing the steps of normalization, indexing and/or segmentation, described in more detail below, a performance metric (performance indicator) may be supplied for the average loss costs per claim of a "standard claim", by which later on the success (or failure) of measures of operative claim management may be made visible.

Normalization

Normalization involves adjusting the claims portfolio or average loss costs per claim for the influence of extraordinary events, which because of their character may distort the average loss costs per claim when compared to other periods. These are e.g. major and accumulative damages and natural events (e.g. hail, flood, etc.). The extraordinary character of those damages manifests itself in above average volatile quantities and loss costs, which might otherwise let the statistic significance sink below an acceptable level.

Indexing

By indexing, the average loss costs per claim in the base period and the average loss costs per claim in the planning period can be brought to comparable levels. At least three types of indexing may be distinguished:

a) price indexing, e.g. by using a general consumer price index, special indexes such as construction price index, etc;

b) condition indexing, e.g. by taking into account product changes in form of adjustments for changed self-retention levels; and c) portfolio indexing, e.g. taking into account changes in the insurers' claim portfolio, objects insured, etc.

Segmentation

The evaluation method may further utilize a segmentation, which divides an initial heterogeneous overall claims' portfolio into as homogeneous as possible sub-groups (segments). The subgroups may be called homogeneous, when they exhibit at least one of the following characteristics:

as uniform as possible behavior of the average loss costs per claim over the time after normalization and indexing of the average loss costs per claim;

as uniform as possible reaction to specific measures of claim management.

Possible criteria for segmentation are for example: class of business, class of insurance, type of damage, cause of damage, object or risk insured, type of payment, sum insured, costs of damage class and characteristics of insurance holder (e.g. private or business customer, sex, age). The statistical significance of the performance indicator may be increased by a combination of more than one of these criteria.

The portfolio segmentation generally requires several rounds of iterations in order to arrive at a final segmentation, which exhibits the above indicated characteristics.

In some cases, additional conditions may be imposed. The choice of the additional conditions taken into account may depend on certain criteria such as insurance class, type of insurance policy, etc.

For example, claims closed without payment may be taken into account if the closure without payment can be traced back to active claim management measures such as fraud prevention, active declination after coverage/liability assessment, etc. Claims that are closed multiple times may optionally find consideration in the calculation only in the period in which they have been closed the last time. Furthermore claims may be optionally excluded for which the value loss costs is not affected by the claim management (e.g. from passive sharing agreements, co-insurance, etc.). Claim payments motivated solely by sales considerations (fair dealing) are optionally not taken into account.

FIG. 4 shows in more detail a determination of the baseline. The determination of the baseline may be carried out one time. Alternatively the base line may be periodically updated based on new data available for the already elapsed periods of time.

A first step in the determination of the baseline S11 may comprise collection of the available data related to the average loss costs per claim within the predetermined base period, for example within the period between the years 1998 and 2003. The data may be stored in a database, for example an MS Access Database, Oracle database or other relational or object databases, which may be accessed by means of conventional or customized database access software tools. The step of data collection S11 may involve calls to the database, which may be internal to the computer system implementing the computer-implemented insurance claim management evaluation method or an external database. The database may further include other relevant data to the insurance claims.

The average loss costs per claim may include the average of the total of the settlement costs, expenses, sharing agreements, reserves, recourse, reserves for recourse etc.

Thereupon a second step S12 of data scope definition may optionally follow, in which all those claims for which the value loss costs is not affected by claim management are excluded. Examples may be claims from passive sharing agreements, co-insurance, etc. Further examples may be claims, wherein both the loss costs are equal to zero or claims with negative loss costs.

In a third normalization step S13, all claims, which are deemed to have extraordinary character may be excluded, since they can distort the statistical significance of the average loss costs per claim. Examples of claims having an extraordinary character may be major damages, natural events (e.g. roof avalanches, hail, etc) or damages with small or greatly fluctuating number in the claim portfolio (e.g. fire, explosion, damage to a seldom insured object or to an entirely new product). Further examples of claims having extraordinary character due to the small number of the claims in the claim portfolio are claims related to particular vehicle types (e.g. trucks, farming vehicles, test vehicles, etc).

In a fourth indexing step S14, the average loss costs per claim on which the baseline may be based (i.e. average loss costs per claim in the base period) and the actual average loss costs per claim measured within the planning period may be brought to comparable levels. This may be achieved by indexing the average loss, so as to take the overall price development into consideration. For example, an adjustment for the overall price changes may be achieved by reevaluating all loss costs of the previous years with the index-value of the current year. Furthermore claim specific price indexing may be employed such as construction costs indexing for glass, fire, tap water or storm damages or consumer price indexing in cases of theft or contents insurances.

The average costs of damage may optionally be further indexed in order to take into account one or more of the structural changes in the portfolio (portfolio-indexing), changes in the customer mix, changes in the amounts insured, etc.

An adjustment for product changes (conditional indexing) may be achieved for example by multiplying the loss costs with a factor indicative of the self-retention share (for example in percent of the amount of settlement or the contractually agreed upon minimum). Changes in the level of the self-retention minimum may lead to an overall change in the number of claims. Furthermore changes in the level of self-retention minimum may lead to changes in the average loss costs per claim. Thus, for example, an increase in the level of self-retention may cause a reduction of the number of damages and an increase in the average loss costs per claim (prior to deduction of the self-retention), while a decrease in the level of self-retention may lead to an increase in the number of damages and a decrease in the average loss costs per claim (prior to deduction of the self-retention). Accordingly, in some cases, it may be required to make an adjustment for the changes in the level of the self-retention minimum in order to assure comparable level of the average loss costs per claim. One way to account for the changed level of self-retention may be to simulate the influence of an increase of 100 US$ in the average self-retention minimum on the baseline.

During the planning period, the level of the average self-retention minimum of the insurance contract portfolio may be determined. When the simulated effect actually occurs, a corresponding adjustment of the measured actual value of the average loss costs per claim may be undertaken.

In particular, one may proceed as follows:
1. Determine of the level of an average self-retention minimum in the base period (e.g. from 1998 to 2003);
2. Determine the baseline of the average loss costs per claim for a predetermined segment (including self-retention);
3. Simulate the influence of an increase of 100 US$ of the average self-retention minimum (e.g. from 300 US$ to 400 US$ in %);
4. Determine the self-retention minimum of the insurance contract portfolio in the planning period (e.g. 2004);
5. Determine the actual average loss costs per claim for the predetermined segment in the planning period; and
6. Multiply the percentage, calculated in the previous step 3. and the average loss costs per claim in the planning period.

An adjustment for the structural changes in the portfolio (portfolio-indexing) such as changes in the customer mix may be achieved for example by a predetermined increase of the loss costs (e.g. by 16%) in case of damages connected to settlement payments on a given customer type, e.g. industrial customers.

An adjustment for the changes in the amount insured may be achieved by indexing of all loss costs of the previous years with the amount insured of the current year.

A fifth step segmentation step S15 of the definition of the baseline may include segmenting the initial heterogeneous group of claims into homogeneous sub-groups.

Figure 5:
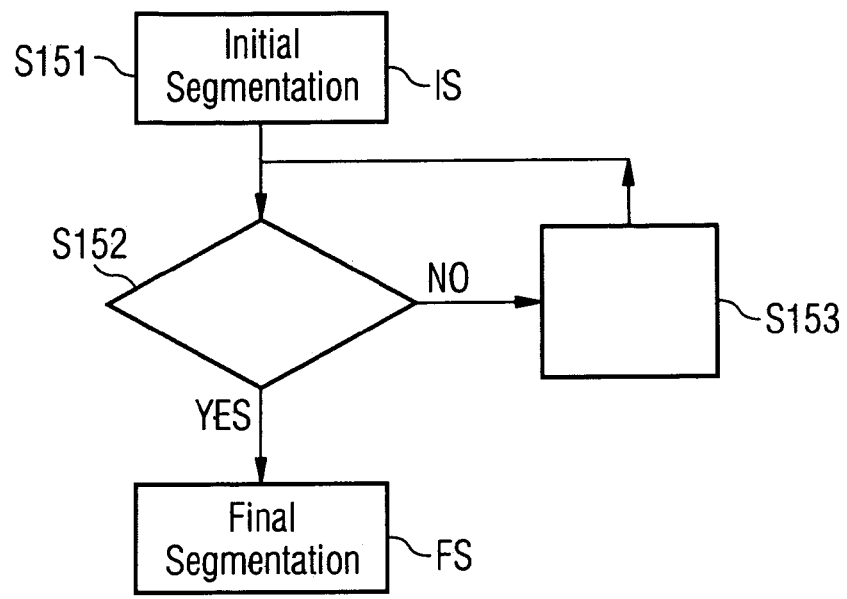
FIG. 5 illustrates a flowchart of a segmenting operation.

FIG. 5 illustrates an example of the segmenting step in more detail. In a first step S151 an initial segmenting of the initial group of claims may be determined. Alternatively no initial segmenting of the initial group of claims may be undertaken.

A second step S152 may include determining whether specific (predetermined or pre-determinable) segmenting requirements are fulfilled. Some of the requirements imposed on the segmenting may be the availability of sufficiently large segments (preferably at least 300 to 500 damages per quarter), as low as possible number of individual segments and the time stability of the initial quarter data of the average amount of loses (that is to say high regression respectively small variation coefficients in the regression development of the baseline).

If the segmenting requirements are not met a third step S153 the initial segmenting may be adjusted and optionally certain damages may be excluded. The steps of adjusting the current segmentation and (optionally) excluding certain damages are repeated until a final segmentation FS satisfying the segmenting requirements may be obtained. Usually multiple iteration steps are required in order to arrive at a final segmentation FS.

Segmenting criteria may include at least one of the following: class of business, class of insurance, type of damage, cause of damage, object or risk insured, type of payment, sum insured, loss costs per claim class, characteristics of insurance policy holder (e.g. private or business customer, sex, age), etc.

A sixth step S16 of the definition of the baseline may include a calculation of the baseline, for example on a quarterly basis, by performing a regression analysis of the initial data of the average loss costs per claim. For example the regression analysis employed may be a linear regression analysis, in particular linear least square regression analysis. Other forms of regression analysis may be employed as well, such as logistic regression, Poisson regression, supervised learning, etc may be employed.

Once the baseline is determined, a prediction for the value for the average loss costs per claim in the planning period may be made by extrapolating the baseline to the planning period.

Figure 6:
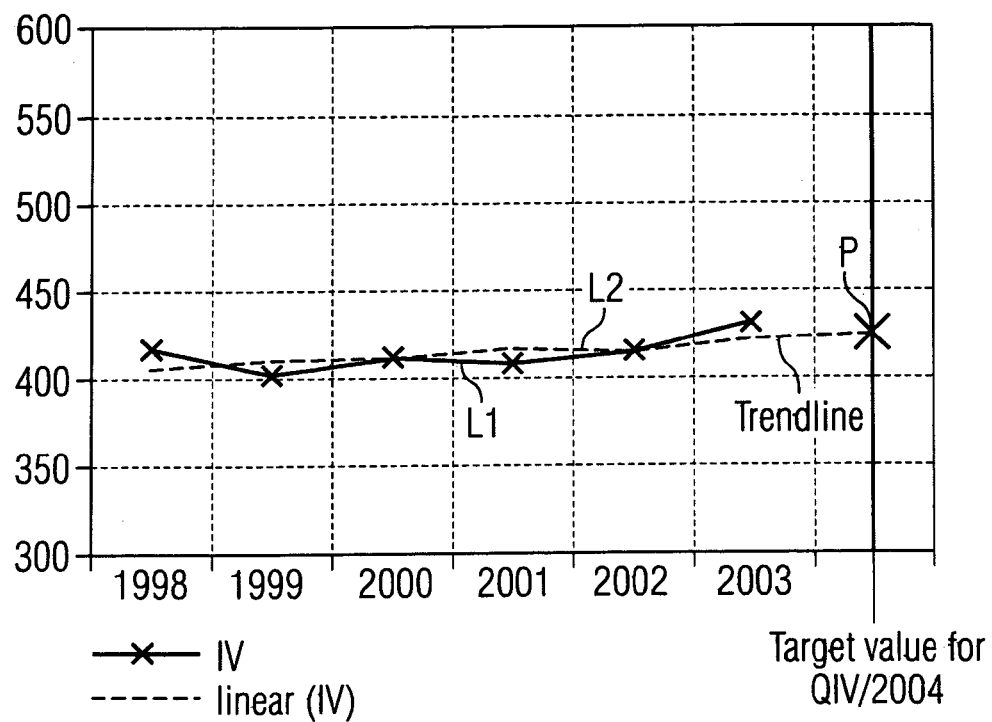
FIG. 6 illustrates an example of a determined baseline for a glass damages insurance class.

FIG. 6 illustrates an example of a baseline for a glass damages insurance class. The baseline is determined via a linear regression of the normalized and indexed initial data for a given segment or insurance class. The baseline shown in FIG. 6 may be determined on a quarterly basis (fourth quarter in the example shown in FIG. 6). Thus the influence of the seasonal effects may be outfactored as far as possible.

The drawn through line L1 in FIG. 6 shows the normalized and indexed initial data of the average loss costs per claim on the fourth quarter of the years 1998 and 2003. The dashed line L2 in FIG. 6 shows the determined via linear regression baseline. After the baseline is determined a prediction for the future trend of the baseline in the planning period may be made, i.e. a trendline may be determined. Point P indicates the forecasted target value at the end of the planning period, which in this specific example is the fourth quarter of the year 2004.

In another example the initial average loss costs per claim (in US$) and the corresponding average value, standard deviation and variation coefficients divided into yearly quarters and insurance claim classes (traffic accidents, glass damages, park damages, animal bites, vandalism) are shown in Table 2.

TABLE 2

| Year | Quarter | Traffic accidents | Glass damages | Park damages | Animal bites | Vandalism |
|---|---|---|---|---|---|---|
| 1998 | QI | 1898 | 436 | 0 | 187 | 1131 |
| 1999 | QI | 2015 | 438 | 1291 | 175 | 1147 |
| 2000 | QI | 1885 | 419 | 0 | 182 | 1093 |
| 2001 | QI | 1809 | 421 | 1092 | 189 | 1138 |
| 2002 | QI | 1891 | 422 | 1092 | 220 | 1081 |
| 2003 | QI | 1821 | 436 | 1106 | 248 | 1059 |
| Standard deviation | | 73.51 | 8.85 | 8.08 | 28.32 | 35.47 |
| Variation coefficient | | 0.039 | 0.021 | 0.007 | 0.141 | 0.032 |
| Average value | | 1887 | 429 | 1097 | 200 | 1108 |
| 1998 | QII | 1788 | 442 | 0 | 176 | 1192 |
| 1999 | QII | 1685 | 448 | 1541 | 180 | 1166 |
| 2000 | QII | 1693 | 456 | 926 | 187 | 1153 |
| 2001 | QII | 1804 | 433 | 1071 | 190 | 1135 |
| 2002 | QII | 1745 | 437 | 1087 | 233 | 1063 |
| 2003 | QII | 1740 | 451 | 1080 | 258 | 1080 |
| Standard deviation | | 48.41 | 8.72 | 7.90 | 33.24 | 50.11 |
| Variation coefficient | | 0.028 | 0.020 | 0.007 | 0.163 | 0.044 |
| Average value | | 1742 | 444 | 1079 | 204 | 1131 |
| 1998 | QIII | 1707 | 434 | 0 | 212 | 1203 |
| 1999 | QIII | 1768 | 429 | 650 | 200 | 1143 |
| 2000 | QIII | 1675 | 441 | 0 | 195 | 1162 |
| 2001 | QIII | 1783 | 425 | 1073 | 217 | 1158 |
| 2002 | QIII | 1707 | 430 | 1071 | 255 | 1103 |
| 2003 | QIII | 1687 | 442 | 1061 | 269 | 1074 |
| Standard deviation | | 44.02 | 6.84 | 6.11 | 30.37 | 45.82 |
| Variation coefficient | | 0.026 | 0.016 | 0.006 | 0.135 | 0.040 |
| Average value | | 1721 | 434 | 1068 | 225 | 1141 |
| 1998 | QIV | 1816 | 416 | 0 | 197 | 1192 |
| 1999 | QIV | 1807 | 402 | 0 | 191 | 1114 |
| 2000 | QIV | 1726 | 411 | 0 | 193 | 1166 |
| 2001 | QIV | 1880 | 408 | 1117 | 217 | 1122 |
| 2002 | QIV | 1849 | 414 | 1077 | 247 | 1135 |
| 2003 | QIV | 1715 | 430 | 1031 | 266 | 1077 |
| Standard deviation | | 65.87 | 9.57 | 43.03 | 31.52 | 40.25 |
| Variation coefficient | | 0.037 | 0.023 | 0.040 | 0.144 | 0.035 |
| Average value | | 1799 | 413 | 1075 | 219 | 1134 |

Table 3 shows an example of corresponding number of claims for the same period (years 1998 to 2003) divided into yearly quarters and insurance claims classes (traffic accidents, glass damages, park damages, animal bites, vandalism.

TABLE 3

| Year | Quarter | Traffic accidents | Glass damages | Park damages | Animal bites | Vandalism |
|---|---|---|---|---|---|---|
| 1998 | QI | 4635 | 8768 | | 840 | 522 |
| 1998 | QII | 5021 | 8037 | | 1318 | 748 |
| 1998 | QIII | 5589 | 6908 | | 1225 | 817 |
| 1998 | QIV | 5888 | 6266 | | 1086 | 757 |
| 1999 | QI | 5998 | 9244 | 1 | 978 | 525 |
| 1999 | QII | 6531 | 10087 | 2 | 1477 | 932 |
| 1999 | QIII | 6002 | 9445 | 3 | 1431 | 1159 |
| 1999 | QIV | 6528 | 8405 | | 1151 | 1057 |
| 2000 | QI | 7568 | 12276 | | 982 | 816 |
| 2000 | QII | 7482 | 12304 | 1 | 1422 | 1179 |
| 2000 | QIII | 6882 | 9267 | | 1302 | 1168 |
| 2000 | QIV | 5517 | 6837 | | 1060 | 911 |
| 2001 | QI | 7955 | 11117 | | 1063 | 999 |
| 2001 | QII | 5842 | 9431 | 2129 | 1312 | 973 |
| 2001 | QIII | 6441 | 8494 | 2487 | 1198 | 1068 |
| 2001 | QIV | 6400 | 6573 | 2423 | 903 | 986 |
| 2002 | QI | 6521 | 9982 | 2246 | 753 | 741 |

TABLE 3-continued

| Year | Quarter | Traffic accidents | Glass damages | Park damages | Animal bites | Vandalism |
|---|---|---|---|---|---|---|
| 2002 | QII | 5615 | 8957 | 2321 | 1097 | 938 |
| 2002 | QIII | 6645 | 7411 | 2569 | 1008 | 921 |
| 2002 | QIV | 5549 | 6078 | 2336 | 825 | 758 |
| 2003 | QI | 6019 | 9365 | 1997 | 699 | 647 |
| 2003 | QII | 5169 | 8448 | 2110 | 866 | 706 |
| 2003 | QIII | 5914 | 7094 | 2369 | 834 | 908 |
| 2003 | QIV | 1592 | 1349 | 597 | 138 | 205 |
| | Sum | 143303 | 202143 | 23591 | 24968 | 20441 |

Table 4 shows the parameters of the baseline determined via linear regression analysis of the data of the average loss costs per claim within the base period (years 1998 to 2003).

TABLE 4

| | Traffic accidents | Glass damages | Park damages | Animal bites | Vandalism |
|---|---|---|---|---|---|
| Slope b | −2.79 | −0.02 | −2.87 | 3.72 | −4.49 |
| Intercept a | 1822.11 | 430.19 | 1132.90 | 165.24 | 1184.77 |
| Coefficient of determination $R^2$ | 0.05322 | 0.00006 | 0.22058 | 0.73942 | 0.56573 |
| F statistic | 8963.02 | 0.28 | 1178.01 | 15956.26 | 23228.25 |

Table 5 shows example of parameters of the baselines for the respective quarters, determined via linear regression analysis of the average loss costs per claim within the base period (years 1998 to 2003).

TABLE 5

| Quarter | Regression analysis | Traffic accidents | Glass damages | Park damages | Animal damages | Vandalism |
|---|---|---|---|---|---|---|
| Q1 | Slope b | −23.80 | −1.21 | 6.96 | 12.87 | −14.66 |
| Q1 | Intercept a | 1969.85 | 432.95 | 1061.79 | 155.10 | 1159.42 |
| Q1 | Coefficient of determination $R^2$ | 0.36687 | 0.06500 | 0.74242 | 0.72329 | 0.59781 |
| Q1 | F statistic | 9913.72 | 25.45 | 96.88 | 2900.66 | 3760.96 |
| Q2 | Slope b | 1.42 | −0.27 | 4.70 | 16.24 | −25.21 |
| Q2 | Intercept a | 1737.46 | 445.22 | 1055.83 | 146.98 | 1219.68 |
| Q2 | Coefficient of determination $R^2$ | 0.00303 | 0.00345 | 0.35368 | 0.83535 | 0.88600 |
| Q2 | F statistic | 35.53 | 1.31 | 44.15 | 4.616.25 | 11122.96 |
| Q3 | Slope b | −4.89 | 0.65 | −5.73 | 13.46 | −21.96 |
| Q3 | Intercept a | 1738.20 | 431.35 | 1097.07 | 177.57 | 1217.43 |
| Q3 | Coefficient of determination $R^2$ | 0.04321 | 0.03154 | 0.87936 | 0.68787 | 0.80415 |
| Q3 | F statistic | 418.71 | 7.39 | 65.67 | 3.172.85 | 8.442.27 |
| Q4 | Slope b | −6.40 | 3.01 | −42.98 | 15.36 | −15.75 |
| Q4 | Intercept a | 1821.18 | 402.83 | 1289.77 | 164.78 | 1189.36 |
| Q4 | Coefficient of determination $R^2$ | 0.03302 | 0.34492 | 0.99768 | 0.83102 | 0.53602 |
| Q4 | F statistic | 716.20 | 158.04 | 3693.98 | 4127.55 | 4340.96 |

The reliability of the determined baseline and thus the reliability of the predicted target value may be evaluated based on different statistical parameters. A measure for the reliability of the determined baseline may be for example the coefficient of determination $R^2$. The coefficient $R^2$ indicated the degree of "fit" of the regression. A value of 0 indicates that the regression may not be used in explaining the dependent variable, and a value of 1 signifies a perfect fit between the dependent variable and a linear combination of the explanatory variables. For example a value of 0.7 may be an indication of a good fit, respectively a reliability of the determined baseline. The coefficient $R^2$ may be computed for example by the formula:

$$R^2 = \frac{\sum (y_t - \bar{y})^2 (\hat{y}_t - \bar{y})^2}{\sum (y_t - \bar{y})^2 \sum (\hat{y}_t - \bar{y})^2}. \tag{3}$$

wherein ŷ is the computed of fitted y of the regression. The coefficient $R^2$ becomes the square of the coefficient of multiple correlation, which is defined as a correlation between the actual and the computed value. To test the success of the regression model a test may be performed on the coefficient $R^2$. This test statistic is called F-statistic. F-statistic is computed according to the formula:

$$F = \frac{R^2/k}{(1-R^2)/(n-k-1)}, \quad (4)$$

wherein k equals the number of explanatory variables (excluding the constant) and n equals the number of usable observations, so that (n−k−1) corresponds to the degrees of freedom. This test statistic follows a F-distribution with k degrees of freedom for the numerator and (n−k−1) degrees of freedom for the denominator.

The reliability of the baseline may be further evaluated based on the regression coefficient (RC), which ranges between zero and one. Regression coefficients which have values close to one are indicative of the greater reliability of the baseline. If the baseline is determined to be substantially even (that is to say neither increasing nor decreasing), the regression coefficient is close to zero and is therefore not a meaningful indicator for the reliability of the determined baseline. In this case, the variation coefficient (VC) may be used to confirm the reliability of the baseline. Low variation coefficient may be an indication of an increased reliability of the baseline Table 6 shows example of the target values for year 2004 predicted on the basis of a regression analysis of the initial data of the average claim losses for the insurance classes traffic accidents, glass damages, park damages and vandalism.

TABLE 6

|  | Traffic accidents | Glass damages | Park damages | Animal bites | Vandalism |
| --- | --- | --- | --- | --- | --- |
| Quarter I | 1803.25 | 424.51 | 1110.51 | 245.22 | 1086.12 |
| Quarter II | 1747.43 | 443.30 | 1088.71 | 260.67 | 1093.63 |
| Quarter III | 1703.96 | 435.90 | 1056.96 | 271.82 | 1107.61 |
| Quarter IV | 1776.40 | 423.87 | 988.93 | 272.29 | 1126.37 |

FIGS. 7 to 10 refer to the insurance class traffic accidents and are based on data for the average claim losses shown in Table 2.

Figure 7:
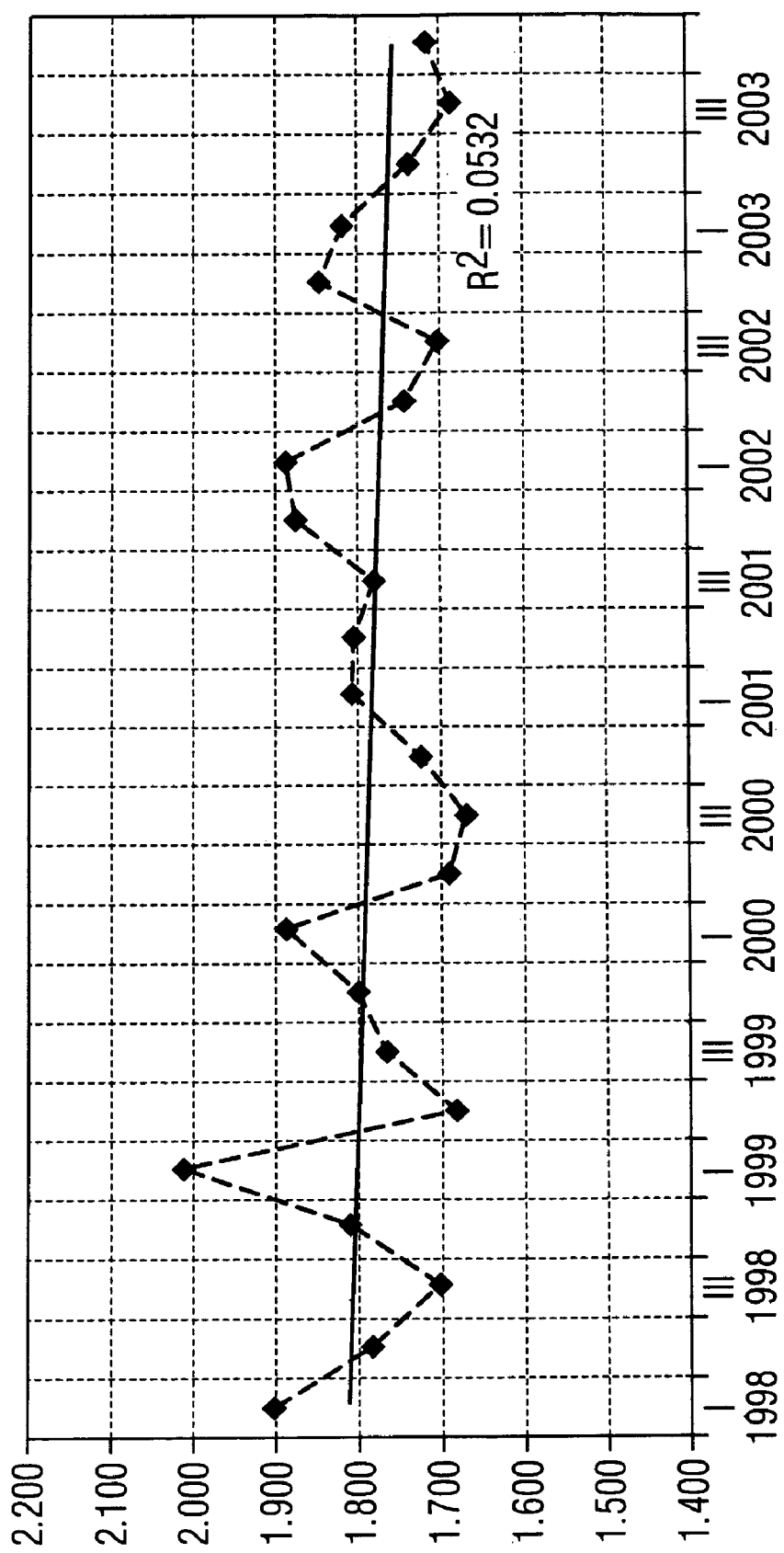
FIG. 7 illustrates an average loss costs per claim in the years 1998 to 2003 for insurance class traffic accidents.

FIG. 7 shows the determined baseline for the insurance class traffic accidents. As explained above, the baseline is determined by linear regression of the initial data (see Tables 2 and 3) of the average claim losses in the period 1998 to 2003. The dashed line shows the normalized and indexed initial average loss costs per claim. The drawn through line shows the baseline determined based on a linear regression analysis of the normalized and indexed initial average loss costs per claim.

Figure 8:
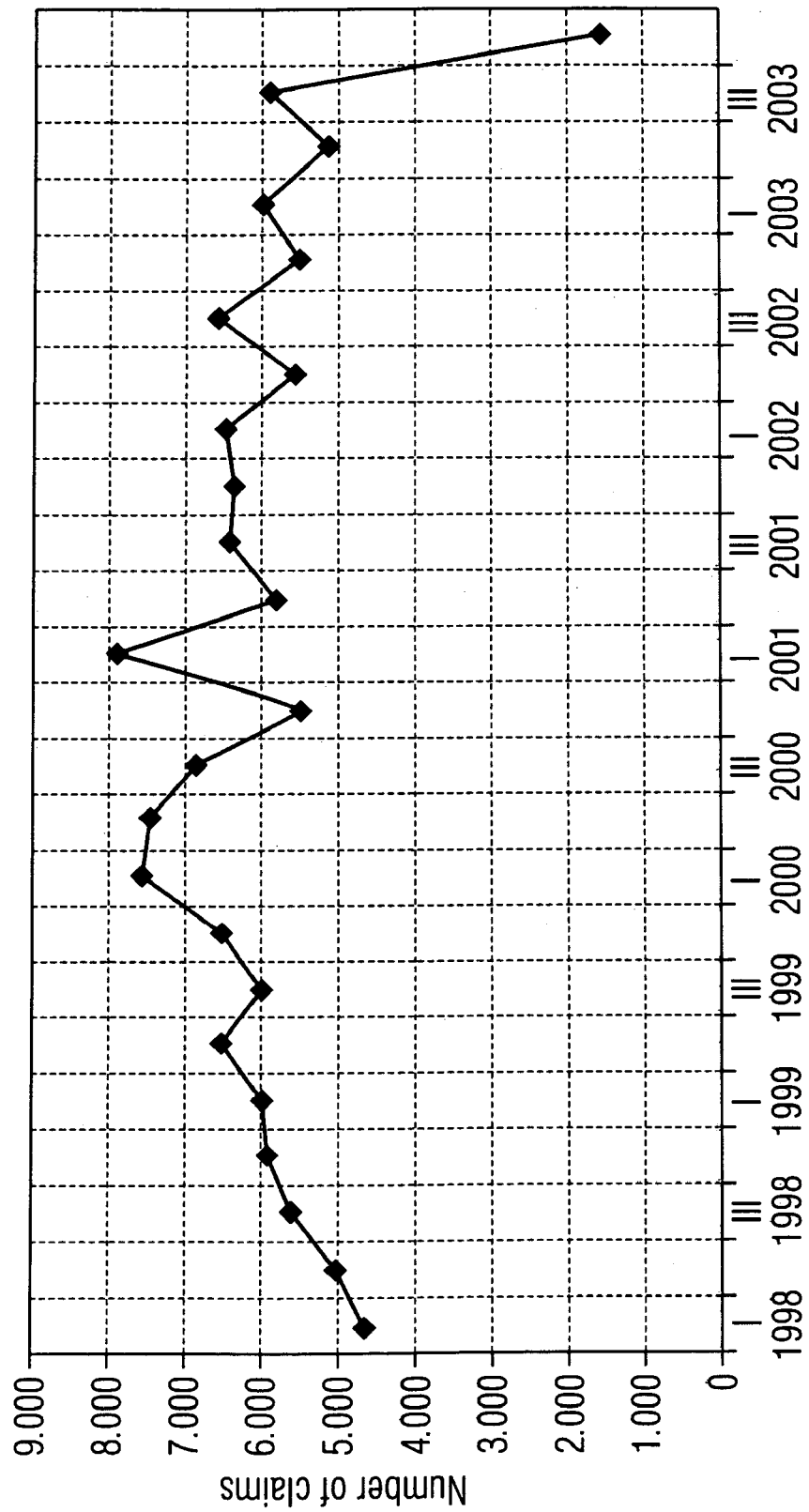
FIG. 8 illustrates a number of claims for insurance class traffic accidents reported in the years 1990 to 2003.

FIG. 8 illustrates the number of claims in the period 1998 to 2003 for the insurance class traffic accidents.

Figure 9:
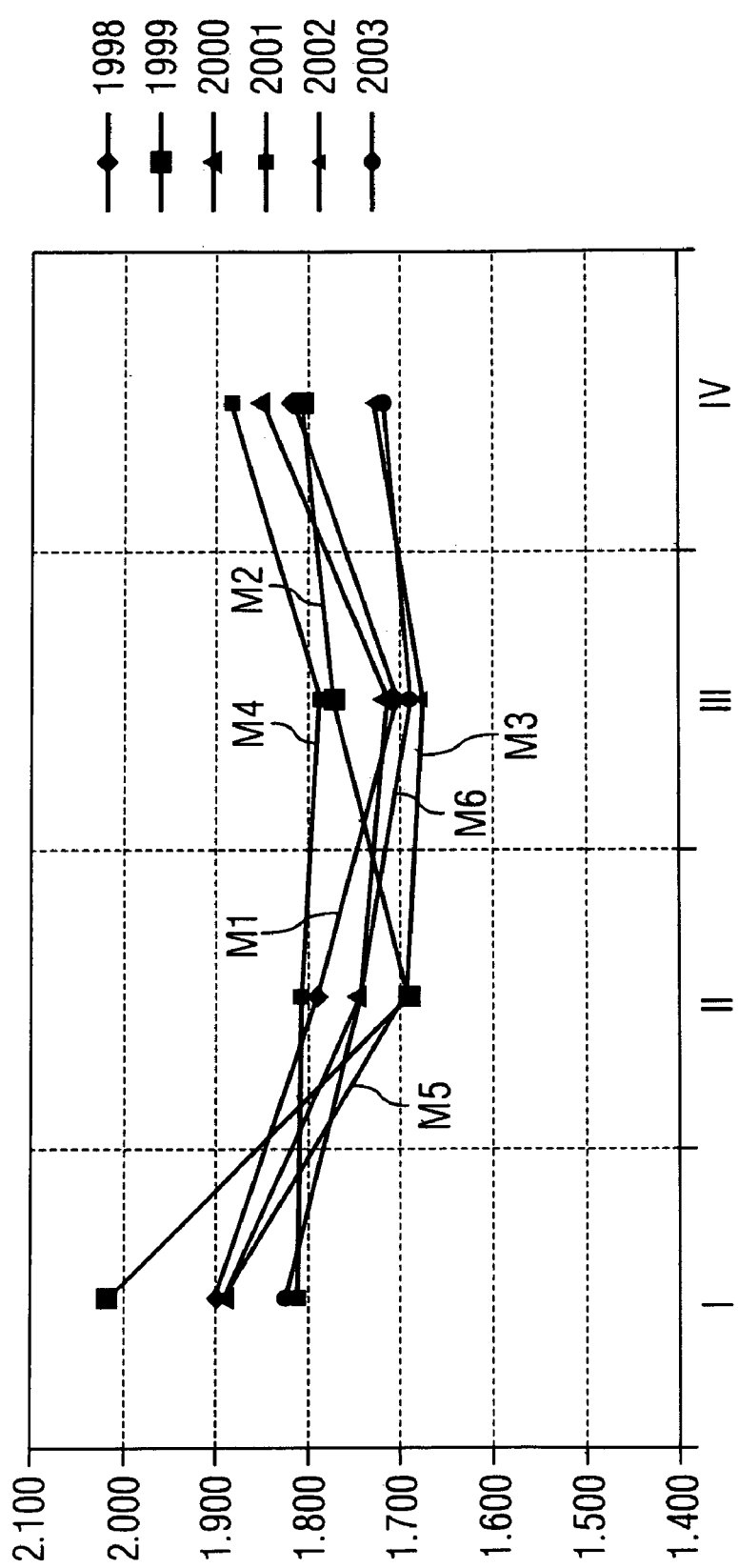
FIG. 9 illustrates an example of a seasonal fluctuation of average loss costs per claim for insurance class traffic accidents.

FIG. 9 shows the seasonal fluctuation of the average loss costs per claim for the insurance class traffic accidents. The abscissa represents the yearly quarters, the ordinate the average loss costs per claim in the respective quarter (I to IV) for the years 1998 to 2003 respectively. Lines M1 to M6 show the seasonal quarter dependency of the average loss costs per claim for the years 1998 to 2003 respectively.

Figure 10:
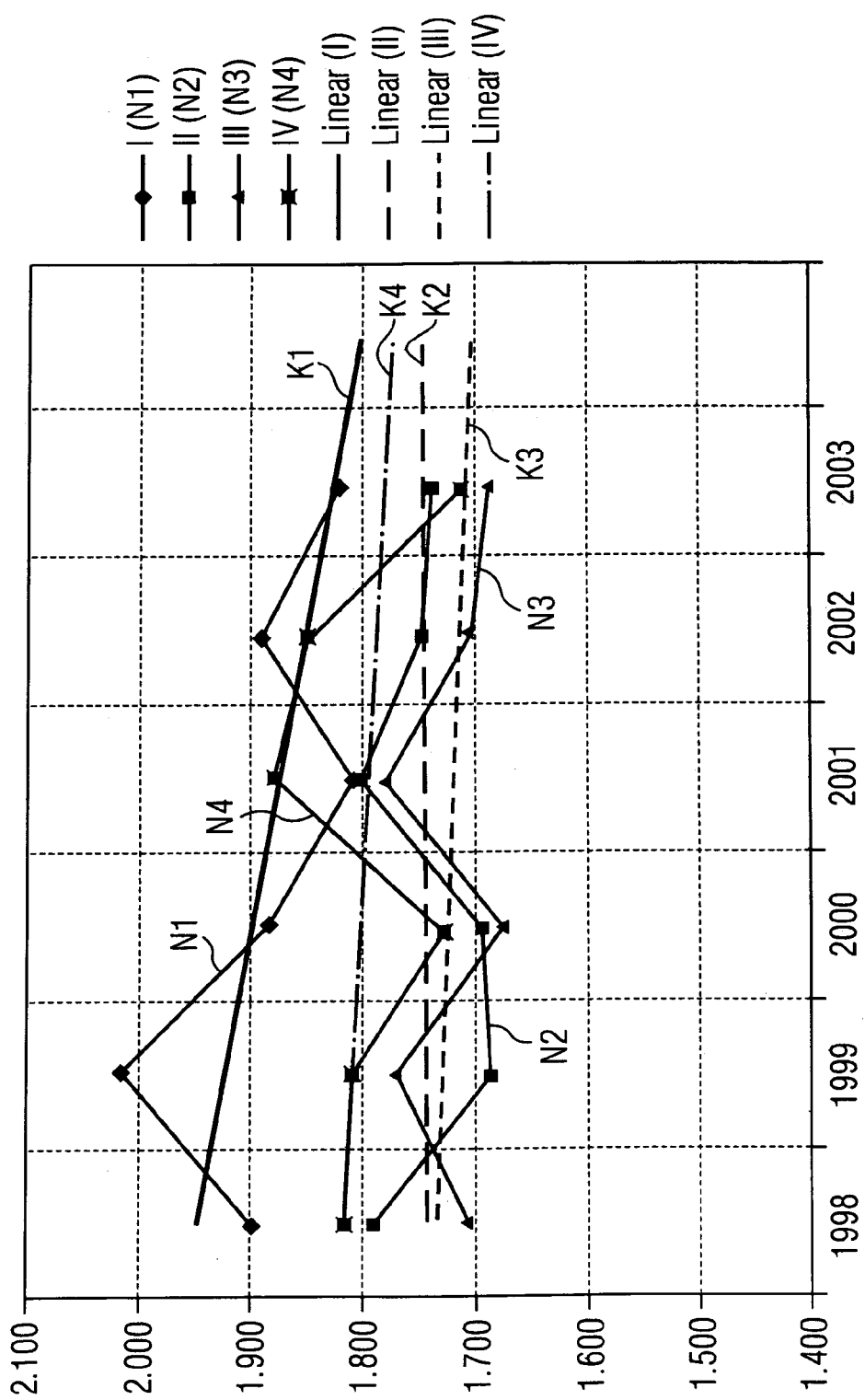
FIG. 10 illustrates a comparison of the determined baselines for each quarter of a year for insurance class traffic accidents.

FIG. 10 shows a comparison of the determined baselines for each of the yearly quarters (one to four) for the insurance class traffic accidents. Lines N1 to N4 represent the average loss costs per claim in each of the quarters QI to QIV after normalizing and indexing. Lines K1 to K4 show the determined by a linear regression analysis of the average loss costs per claim in the respective quarter baselines.

In order to compensate for possible seasonal variation, the baseline may be determined on a quarterly basis (i.e. separate baseline for the individual yearly quarters).

The above indicated steps S11 to S16 of the determination of the baseline may be automatically performed by means of the general purpose computing device for example, the conventional computing environment 20 described above. The determination of the baseline may involve multiple repetitions or iterations of one or more of the steps S11 to S16.

The predicted target value may be compared to the actual value in the planning period, forming thus a quantifiable measure (performance indicator) indicative of the claim management in the planning period. To this end data concerning the actually achieved levels of the average loss costs per claim in the planning period may be collected. The data of the average loss costs gathered in the planning period may be subject to a similar processing as the data within the base period, which has served as a base for the determination of the baseline and the target value.

Figure 11:
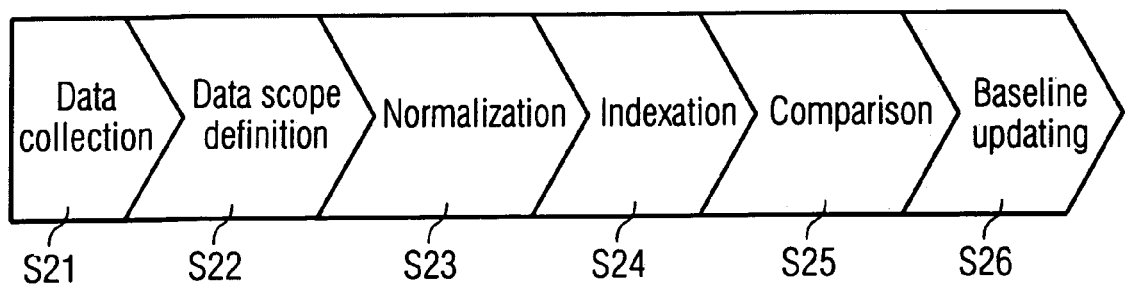
FIG. 11 illustrates a flow chart of a method for evaluating claim management in a predetermined planning period.

In FIG. 11 a flow chart of a recurring evaluation of the success of the claim management in a predetermined planning period is shown. The process of success evaluation may comprise one or more of the following steps:

In a first step S21 data related to the average loss costs per claim in the planning period may be collected. The collection step may include calls to a database in which the data related to the average loss costs per claim and other relevant data are stored. The data may be stored in a database such as for example Microsoft Access, Oracle or other relation or object database and be accessed by using one of the state of the art database access tools.

A second data scope definition step S22 may exclude all those claims for which the loss costs is not affected by claim management. This step may be performed analogously to differentiation step S12 of the determining of the baseline.

The third step S23 may include normalization of the initial average loss costs, similar to the above described step S13 of normalization of the historical average loss costs per claim to determine the baseline.

The fourth step S24 may comprise indexing of the average costs of damage in the planning period that may be parallel to the step S14 of indexing the historical data related to the costs of damage to determine the baseline. The step of indexing may include at least one of price and portfolio indexing.

First to fourth steps of the method for evaluating of the insurance claim management in a predetermined planning period may substantially correspond to first to fourth steps of the determination of the baseline, respectively. Accordingly, a detailed description of those steps is omitted and a reference to the corresponding steps of the determination of the baseline is made.

A fifth step S25, may include a comparison of the normalized and indexed baseline with the normalized and indexed actual values of the average loss costs per claim in the planning period. The comparison may be made for the corresponding quarter of the year. Based on a comparison of the baseline, respectively the forecasted target value for the average loss costs per claim, with the actually realized data of the average loss costs per claim, a performance indicator may be calculated. The performance indicator may be expressed as the difference between the target value and the actually realized value, multiplied by the actual number of claims.

Optionally a sixth step S26, may include updating of the baseline with the new actual value of the loss costs and when required expansion of the time series, which from a basis for the determination of the baseline, to the comparison period (e.g. corresponding quarter) of the subsequent year.

Preferably one or more of the above steps S21 to S26 are automated.

The determined performance indicator allows measurement of the result of the claim management with a quantifiable statistical accuracy. In order to obtain more information regarding the actual causes for the obtained result of the claim management, an ex-post analysis of the already closed files may be additionally performed.

The subject matter described herein is particularly suited for standardized mass business representative in volume. It is thus particularly applicable to approximately three quarters of claims and two thirds of loss costs of a typical composite insurer. Examples of insurance classes, wherein the application of the present subject matter may be particularly advantageous are comprehensive vehicle and property damage insurance, glass insurance, liability insurance, contents insurance, tap water insurance, electrical appliances insurance, fire insurance, storm and tempest insurance, theft insurance, etc. For a typical insurance company about 85 percent of the number of claims and about 69 percent of the total loss costs may refer to cases in which the present subject matter may be applied.

One or more of the following criteria may be used to determine whether the present subject matter would be useful for a certain insurance class:

Claims exceeding certain loss costs per claim
Natural disasters
Certain vehicle types
Extremely small claim segments
A great heterogenity of the risks within the particular insurance class,
Industrial insurance business;
An exclusively individual contract design etc.
Basis for Outsourcing The beneficial utility of the subject matter described herein lies in the measurability of the result contribution of the operative claim management to the loss costs and company profit. The method thus allows an ex-post verification of the result of a claim management projects executed in the past. For companies that beyond this consider an outsourcing of claim management, the present subject matter offers for the first time a basis for a focused result, respectively risk sharing of the service provider, since in particular the cost and quality control are seen by the decision makers in insurance companies as being the crucial factors of success for outsourcing considerations.

On the other hand, a service provider will be willing to shoulder only such risks which he can influence himself. This can become an obstacle when outsourcing claim management, because the loss costs may still be influenced to a large extent by the insurance company and in addition may be affected by external developments. Therefore, methods are needed that exclude external developments and risks that lie solely in the area of control of the insurance company from the evaluation basis for the success of the service provider.

The present subject matter advantageously fulfills this requirement. It thus may serve as the basis for such outsourcing agreements, in which the service provider may be remunerated in part on the basis of his contribution in reducing the loss costs. This is an important innovation in insurance business, as service providers in future may be measured not only by their contribution in reducing IT or administration costs, but also by their actual contribution to the core business of the insurance company.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

The invention claimed is:

1. A computer-implemented method comprising:
   accessing, using one or more processors, available data related to actual average loss costs per claim values paid by an insurer during a past base period in connection with claims for insurance on property that were operatively managed by a third-party service provider;
   adjusting, using the processors, the available data to compensate for a stochastic influence of external and internal influence unrelated to the operative management of the third-party service provider, further comprising:

normalizing, using the processors, the available data to exclude those claims associated with extraordinary events which manifest themselves in above-average volatile quantities and loss costs, indexing, using the processors, the available data to compensate at least for price inflation, and selecting, using the processors, the available data that is associated with a homogenous sub-segment of the claims;

using the processors to perform a regression analysis of the adjusted data;

determining, using the processors, a target average loss costs per claim value at a particular past time occurring after the base period based on performing the regression analysis;

determining, using the processors, an actual average loss costs per claim value at the particular past time, using the available data;

determining, using the processors, and as a performance indicator metric, a difference between the target average loss costs per claim value and the actual average loss costs per claim value, multiplied by an actual number of claims in the homogenous sub-segment; and affecting, using the processors, a payment made by the insurer to the third-party service provider based on the performance indicator metric.

2. The method of claim 1, further comprising:

identifying one or more individual management measures implemented by the third-party service provider that are responsible for causing the difference between the target average loss costs per claim value and the actual average loss costs per claim value.

3. The method of claim 2, wherein identifying the one or more individual management measures further comprises attributing the difference between the target average loss costs per claim value and the actual average loss costs per claim value among a specialization management measure, a replacement-in-kind management measure, a recourse management measure, and a fraud prevention management measure implemented by the third-party service provider.

4. The method of claim 1, where performing the regression analysis further comprises performing a Poisson regression or a logistic regression.

5. The method of claim 1, wherein normalizing the available data further comprises excluding statistical distortions caused by natural disasters.

6. The method of claim 1, wherein, in addition to price inflation, the available data is indexed to compensate for changes to the property being insured, and for changes in a level of a self-retention minimum.

7. The method of claim 1, wherein the homogeneous sub-segment is associated with a single particular class of business, class of insurance, type of damage, cause of damage, object or risk insured, type of payment, sum insured, cost of damage class, or characteristic of insurance holder.

8. The method of claim 1, wherein normalizing the available data further comprises excluding those claims with zero or negative loss costs.

9. The method of claim 1, wherein normalizing the available data further comprises excluding those claims having an extraordinary character due to a relatively small number of claims in a claim portfolio.

10. A system comprising:

one or more computers; and a computer-readable medium coupled to the one or more computers having instructions stored thereon which, when executed by the one or more computers, cause the one or more computers to perform operations comprising:

accessing available data related to actual average loss costs per claim values paid by an insurer during a past base period in connection with claims for insurance on property that were operatively managed by a third-party service provider, adjusting the available data to compensate for a stochastic influence of external and internal influence unrelated to the operative management of the third-party service provider, further comprising:

normalizing the available data to exclude those claims associated with extraordinary events which manifest themselves in above-average volatile quantities and loss costs, indexing the available data to compensate at least for price inflation, and selecting the available data that is associated with a homogenous sub-segment of the claims, performing a regression analysis of the adjusted data, determining a target average loss costs per claim value at a particular past time occurring after the base period based on performing the regression analysis, determining an actual average loss costs per claim value at the particular past time, using the available data, determining, as a performance indicator metric, a difference between the target average loss costs per claim value and the actual average loss costs per claim value, multiplied by an actual number of claims in the homogenous sub-segment, and affecting a payment made by the insurer to the third-party service provider based on the performance indicator metric.

11. The system of claim 10, further comprising:

identifying one or more individual management measures implemented by the third-party service provider that are responsible for causing the difference between the target average loss costs per claim value and the actual average loss costs per claim value.

12. The system of claim 11, wherein identifying the one or more individual management measures further comprises attributing the difference between the target average loss costs per claim value and the actual average loss costs per claim value among a specialization management measure, a replacement-in-kind management measure, a recourse management measure, and a fraud prevention management measure implemented by the third-party service provider.

13. The system of claim 10, where performing the regression analysis further comprises performing a Poisson regression or a logistic regression.

14. The system of claim 10, wherein normalizing the available data further comprises excluding statistical distortions caused by natural disasters.

15. The system of claim 10, wherein, in addition to price inflation, the available data is indexed to compensate for changes to the property being insured, and for changes in a level of a self-retention minimum.

16. The system of claim 10, wherein the homogeneous sub-segment is associated with a single particular class of business, class of insurance, type of damage, cause of damage, object or risk insured, type of payment, sum insured, cost of damage class, or characteristic of insurance holder.

17. The system of claim 10, wherein normalizing the available data further comprises excluding those claims with zero or negative loss costs.

18. The system of claim 10, wherein normalizing the available data further comprises excluding those claims having an extraordinary character due to a relatively small number of claims in a claim portfolio.

19. A computer storage medium encoded with a computer program, the program comprising instructions that when executed by data processing apparatus cause the data processing apparatus to perform operations comprising:
   accessing available data related to actual average loss costs per claim values paid by an insurer during a past base period in connection with claims for insurance on property that were operatively managed by a third-party service provider;
   adjusting the available data to compensate for a stochastic influence of external and internal influence unrelated to the operative management of the third-party service provider, further comprising:
      normalizing the available data to exclude those claims associated with extraordinary events which manifest themselves in above-average volatile quantities and loss costs,
      indexing the available data to compensate at least for price inflation, and
      selecting the available data that is associated with a homogenous sub-segment of the claims;
   performing a regression analysis of the adjusted data;
   determining a target average loss costs per claim value at a particular past time occurring after the base period based on performing the regression analysis;
   determining an actual average loss costs per claim value at the particular past time, using the available data;
   determining, as a performance indicator metric, a difference between the target average loss costs per claim value and the actual average loss costs per claim value, multiplied by an actual number of claims in the homogenous sub-segment; and
   affecting a payment made by the insurer to the third-party service provider based on the performance indicator metric.

20. The computer storage medium of claim 19, further comprising:
   identifying one or more individual management measures implemented by the third-party service provider that are responsible for causing the difference between the target average loss costs per claim value and the actual average loss costs per claim value.

21. The computer storage medium of claim 20, wherein identifying the one or more individual management measures further comprises attributing the difference between the target average loss costs per claim value and the actual average loss costs per claim value among a specialization management measure, a replacement-in-kind management measure, a recourse management measure, and a fraud prevention management measure implemented by the third-party service provider.

22. The computer storage medium of claim 19, where performing the regression analysis further comprises performing a Poisson regression or a logistic regression.

23. The computer storage medium of claim 19, wherein normalizing the available data further comprises excluding statistical distortions caused by natural disasters.

24. The computer storage medium of claim 19, wherein, in addition to price inflation, the available data is indexed to compensate for changes to the property being insured, and for changes in a level of a self retention minimum.

25. The computer storage medium of claim 19, wherein the homogeneous sub-segment is associated with a single particular class of business, class of insurance, type of damage, cause of damage, object or risk insured, type of payment, sum insured, cost of damage class, or characteristic of insurance holder.

26. The computer storage medium of claim 19, wherein normalizing the available data further comprises excluding those claims with zero or negative loss costs.

27. The computer storage medium of claim 19, wherein normalizing the available data further comprises excluding those claims having an extraordinary character due to a relatively small number of claims in a claim portfolio.

* * * * *

UNITED STATES PATENT AND TRADEMARK OFFICE
CERTIFICATE OF CORRECTION

| | | |
|---|---|---|
| PATENT NO. | : 7,664,690 B2 | Page 1 of 1 |
| APPLICATION NO. | : 11/193290 | |
| DATED | : February 16, 2010 | |
| INVENTOR(S) | : Erwin Dirnberger | |

It is certified that error appears in the above-identified patent and that said Letters Patent is hereby corrected as shown below:

In column 22, line 27, in claim 24, delete "self retention" and insert --self-retention--, therefor.

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,664,690 B2  Page 1 of 1
APPLICATION NO. : 11/193290
DATED : February 16, 2010
INVENTOR(S) : Dirnberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1236 days.

Signed and Sealed this

Thirtieth Day of November, 2010

David J. Kappos
*Director of the United States Patent and Trademark Office*